United States Patent
Svenson et al.

(10) Patent No.: US 7,401,716 B2
(45) Date of Patent: Jul. 22, 2008

(54) ADJUSTABLE SHELF SYSTEM

(75) Inventors: Richard N. Svenson, Northville, MI (US); Tom Delano, Shelby Twp., MI (US)

(73) Assignee: Intier Automotive Inc., Newmarket (CA)

( * ) Notice: Subject to any disclaimer, the term of this patent is extended or adjusted under 35 U.S.C. 154(b) by 602 days.

(21) Appl. No.: 10/896,200

(22) Filed: Jul. 21, 2004

(65) Prior Publication Data

US 2006/0016840 A1     Jan. 26, 2006

(51) Int. Cl.
*B60R 7/00*     (2006.01)

(52) U.S. Cl. ...................... 224/42.32; 224/539; 224/553

(58) Field of Classification Search ............... 224/42.32, 224/542, 543; 312/311, 350; 108/141, 143, 108/138; 211/90.02, 94.01; 126/339
See application file for complete search history.

(56) References Cited

U.S. PATENT DOCUMENTS

| | | | | |
|---|---|---|---|---|
| 1,188,792 A | * | 6/1916 | Kormendy | 108/5 |
| 3,220,364 A | * | 11/1965 | Sandin | 108/147.16 |
| 4,124,262 A | * | 11/1978 | Schill | 312/305 |
| 4,379,429 A | * | 4/1983 | Gubbe et al. | 108/5 |
| 5,199,729 A | * | 4/1993 | Sievert et al. | 280/47.35 |
| 5,472,270 A | * | 12/1995 | Czarnecky et al. | 312/265.6 |
| 5,669,537 A | * | 9/1997 | Saleem et al. | 224/539 |
| 6,733,060 B1 | * | 5/2004 | Pavkov et al. | 296/37.16 |

FOREIGN PATENT DOCUMENTS

JP     63093641     *     4/1988
WO     WO 03/095912 A1     *     11/2003

* cited by examiner

*Primary Examiner*—Nathan J Newhouse
*Assistant Examiner*—Margaret Olson
(74) *Attorney, Agent, or Firm*—Honigman Miller Schwartz and Cohn LLP (57) ABSTRACT

An adjustable shelf system includes a shelf capable of being moved from a first position slidably mounted within a first pair of track members to a second position slidably mounted within a second pair of track members without being completely removed from said first and second pair of track members. A method is also disclosed.

14 Claims, 9 Drawing Sheets

FIG. 9

ADJUSTABLE SHELF SYSTEM

TECHNICAL FIELD

The present invention generally relates to an adjustable shelf system. More particularly, the invention relates to a shelf capable of being moved from a first position slidably mounted within a first pair of track members to a second position slidably mounted within a second pair of track members without being completely removed from the first and second pair of track members.

BACKGROUND OF THE INVENTION

It has been commonplace in the automotive industry to provide a compartmental area for the stowage and transportation of cargo, such as, for example, groceries, golf clubs, and the like. Compartmental stowage areas for sedan-type vehicles have typically included a trunk, which is isolated from the passenger compartment area of the vehicle. Recently, with the popularity of sport utility vehicles (SUVs) and minivans, the compartmental stowage area for the vehicle may often include a load floor of the passenger compartment.

Although adequate for most situations, removable, adjustable, or permanent seating configurations of a vehicle may not permit a vehicle operator to maximize the stowage potential about the load floor. For example, if a family of six were to occupy the vehicle at one time, it may not be possible to remove or reconfigure the seating to increase the stowage capacity about the load floor. As such, a need exists for improving compartmental stowage areas within a vehicle.

BRIEF DESCRIPTION OF THE DRAWINGS

The inventors of the present invention have recognized these and other problems associated with conventional vehicular cargo stowage. The present invention will now be described, by way of example, with reference to the accompanying drawings, in which.

DESCRIPTION OF THE PREFERRED EMBODIMENT

Figure 1:
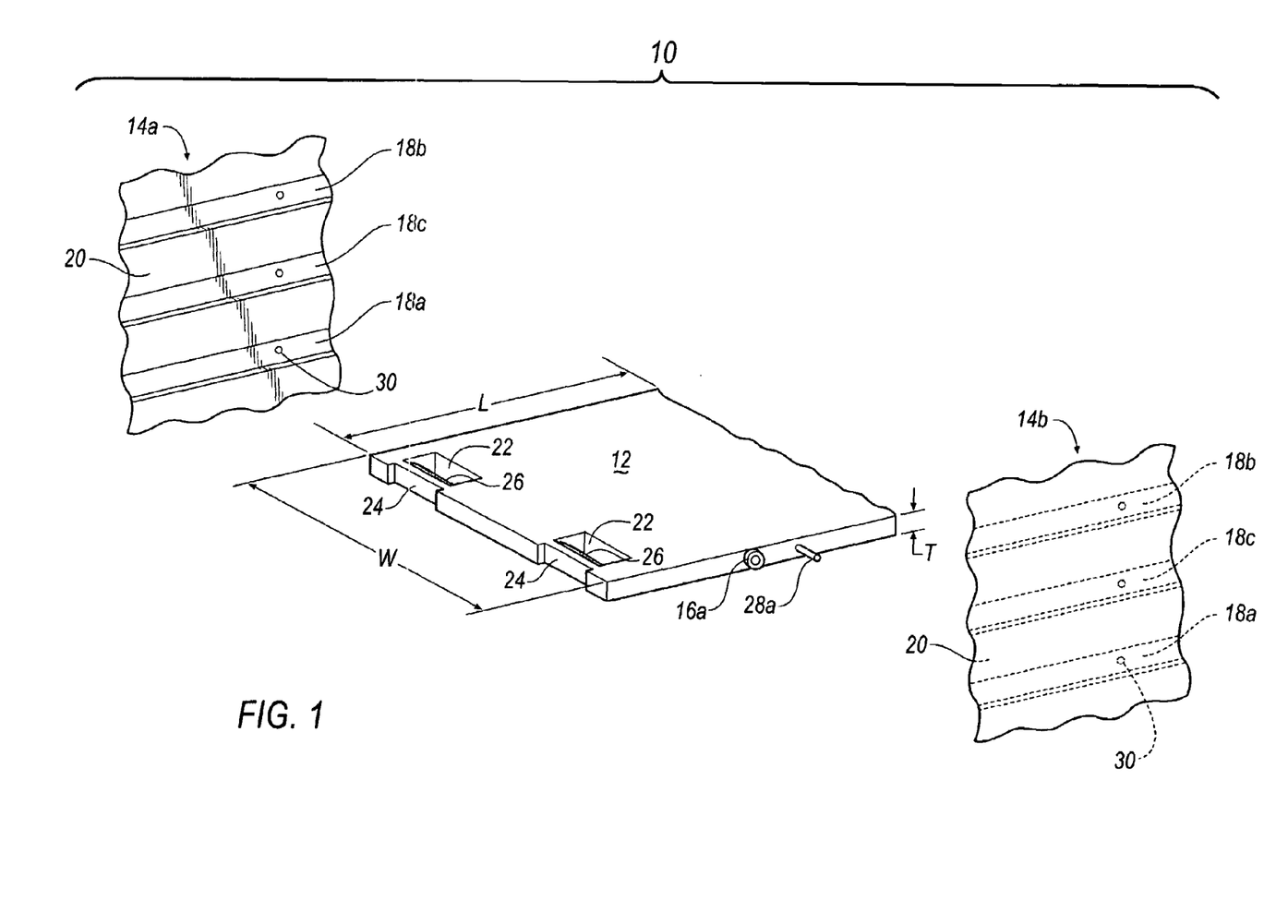
FIG. 1 is a cutaway exploded view of an adjustable shelf system according to an embodiment of the invention.
Figure 2A:
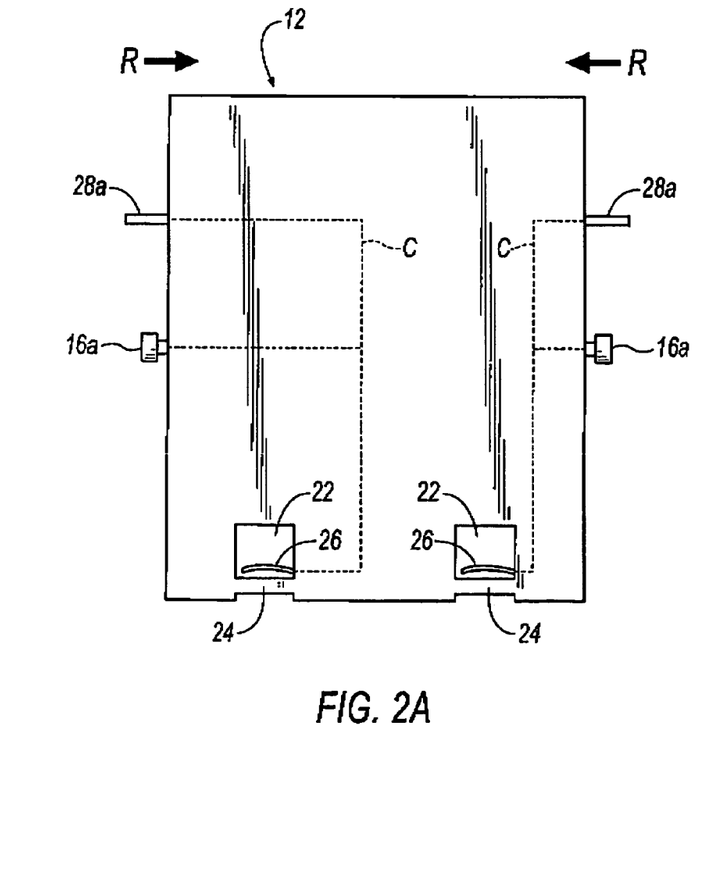
FIG. 2A is a top view of the shelf according to FIG. 1 illustrating a pair of roller elements and two locking pins in an extended position according to an embodiment of the invention.
Figure 2B:
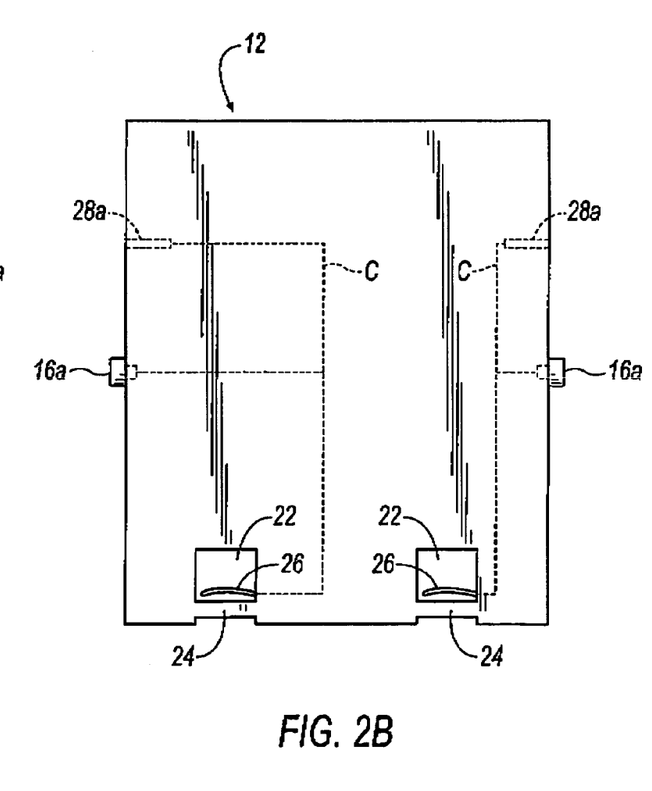
FIG. 2B is a top view of the shelf according of FIG. 2A when the pairs of roller elements and locking pins are in a retracted position according to an embodiment of the invention.
Figure 3:
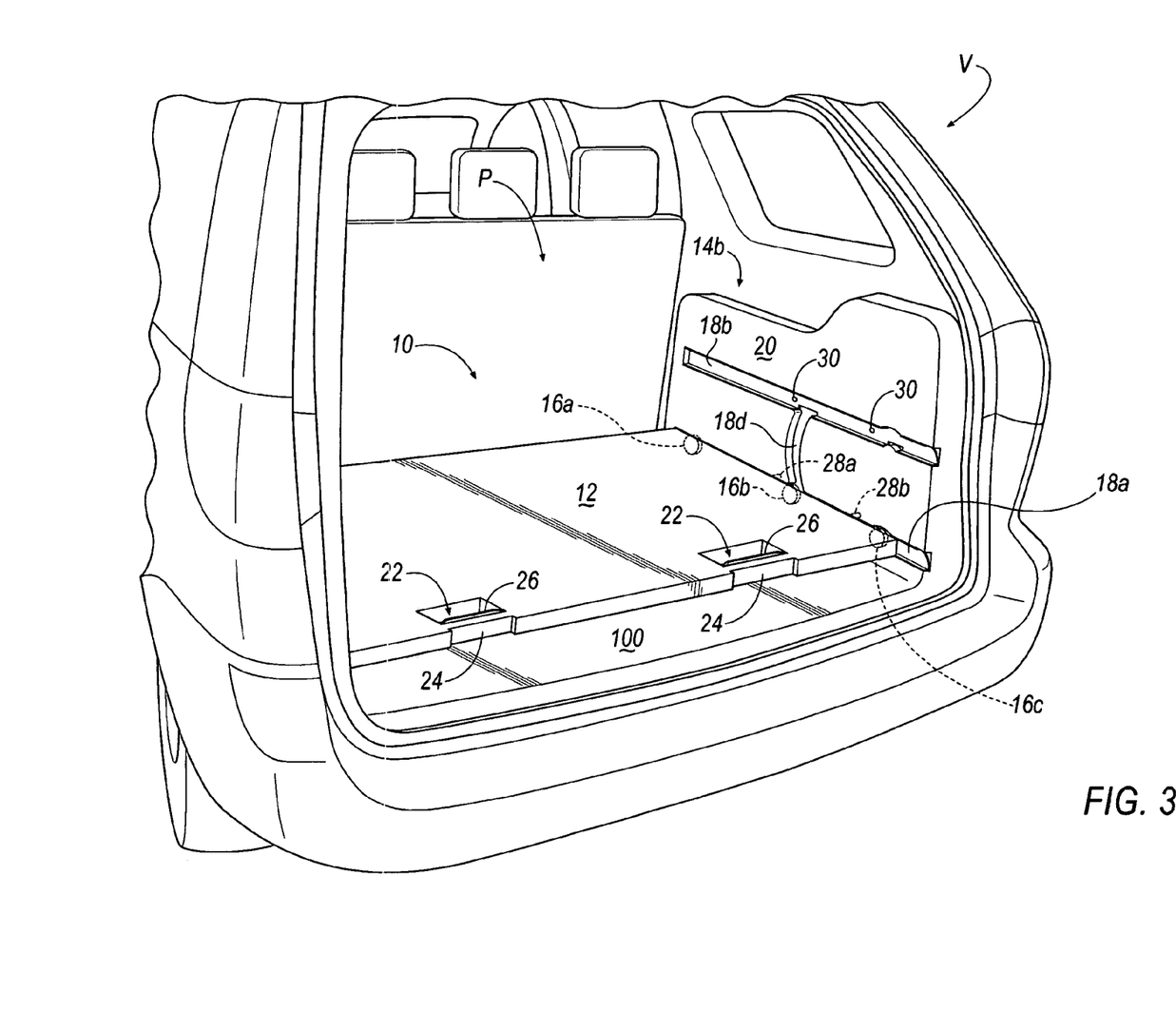
FIG. 3 is a rear perspective view of a vehicle illustrating an application of an adjustable shelf system with a shelf located in a first stowed position according to an embodiment of the invention.
Figure 4A:
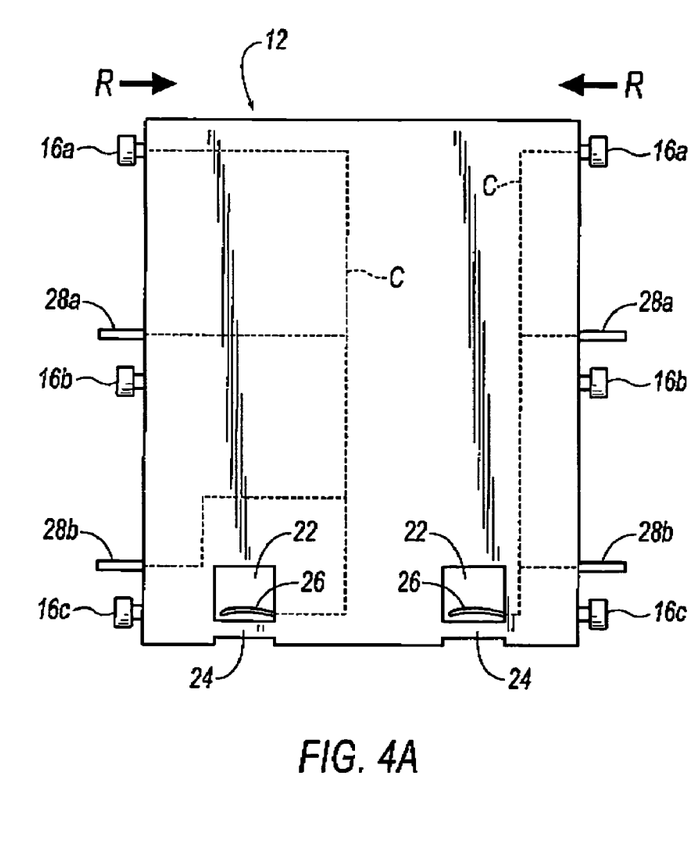
FIG. 4A is a top view of the shelf according to FIG. 3 illustrating pairs of roller elements and locking pins in an extended position according to an embodiment of the invention.
Figure 4B:
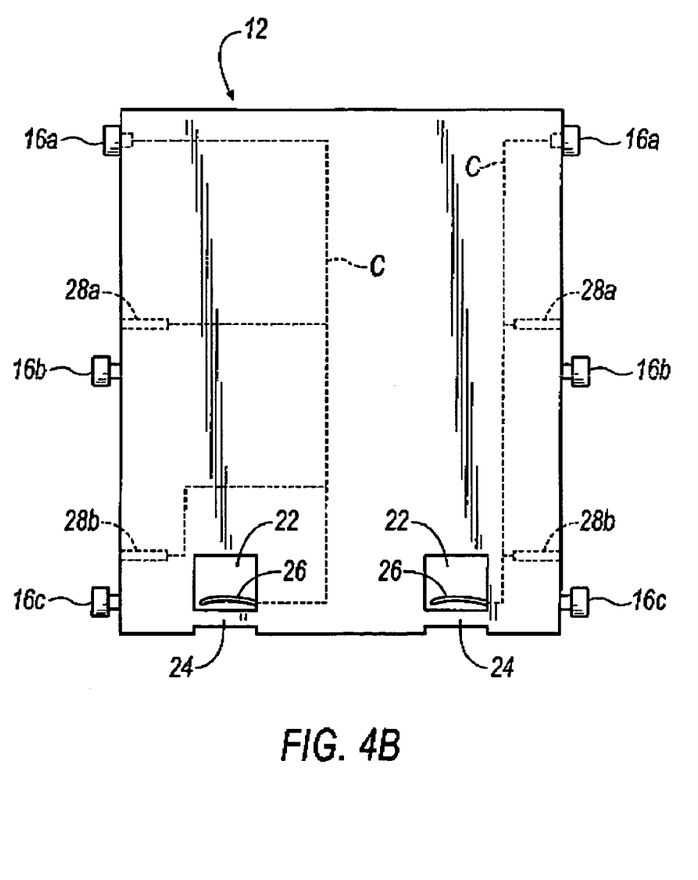
FIG. 4B is a top view of the shelf according of FIG. 4A when the pairs of roller elements and locking pins are in a retracted position according to an embodiment of the invention.
Figure 9:
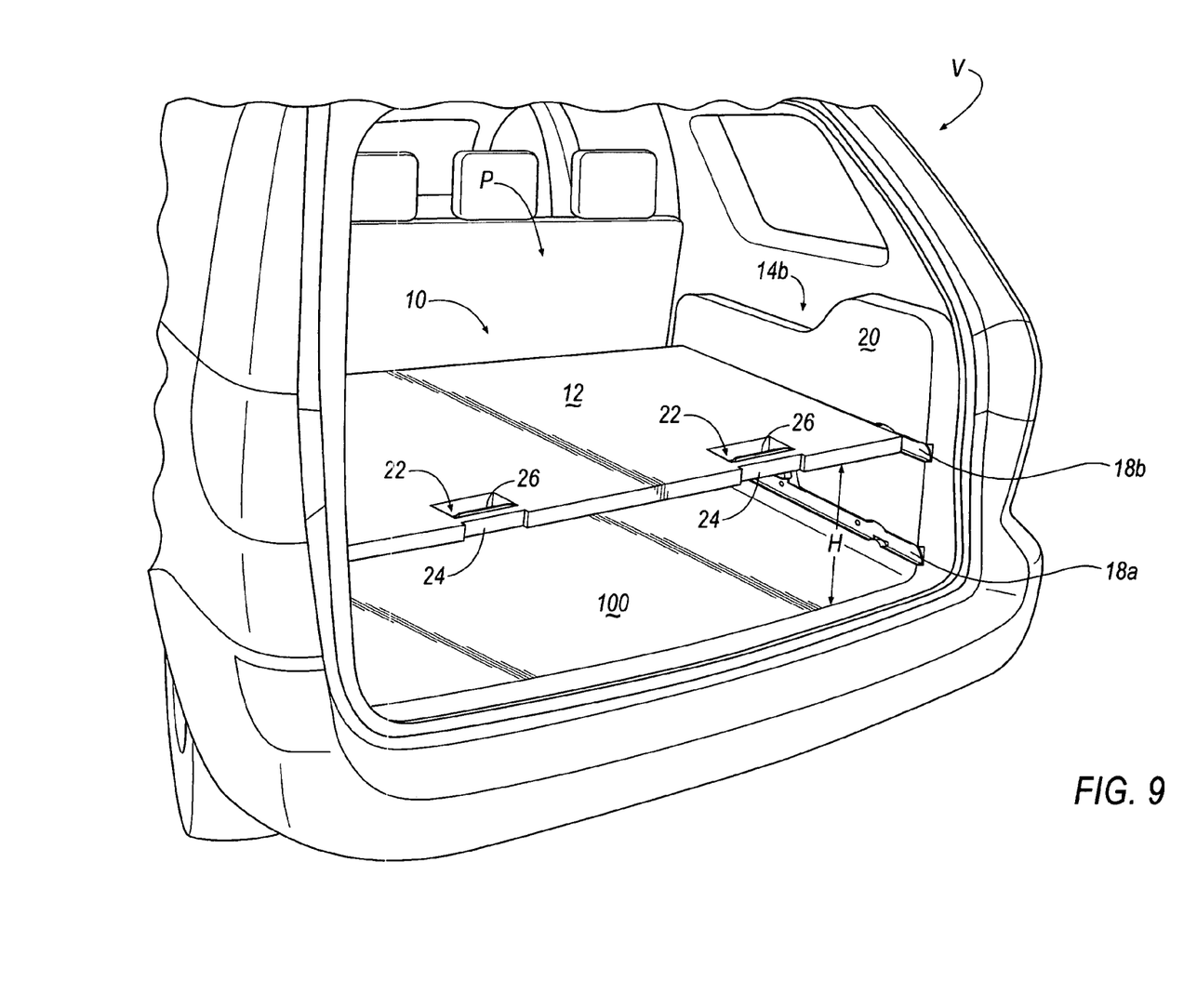
FIG. 9 is a rear perspective view of the vehicle illustrating the adjustable shelf system according to FIG. 8 located in a second stowed position according to an embodiment of the invention.

The above described disadvantages are overcome and a number of advantages are realized by an inventive adjustable shelf system, which is seen generally at 10 in FIGS. 1, 3 and 9. In general, the adjustable shelf system 10 generally comprises a shelf 12 including any desirable thickness, T, length, L, and width, W. The shelf 12 maybe solid, hollowed, and, if desired, may include a painted, textured, or fabric surface. According to one aspect of the invention illustrated in FIG. 1, the shelf 12 is slidably and pivotably adjustable between two opposing substantially parallel surfaces 14a, 14b. As illustrated in FIGS. 1-2B, the shelf 12 includes at least one pair of roller elements, which is indicated generally at 16a, that are slidably received within a plurality of pairs of track members, which are indicated generally at 18a, 18b, 18c. The pairs of track members 18a-18c are opposingly located about inboard surfaces 20 of each of the opposing substantially parallel surfaces 14a, 14b. If desired, the pairs of track members 18a-18c may be disposed within recesses formed in each of the opposing substantially parallel surfaces 14a, 14b. It will be appreciated that to invention is not limited by the number of pairs of roller members 16a and track members 18a-18c, and that the invention can be practiced with any desirable number of roller members 16a and track members 18a-18c.

Although there are many applications for the shelf system 10 of the invention, one application of the invention is illustrated in FIGS. 3 through 9, in which the adjustable shelf system 10 is mounted in a passenger compartment area, P, of a vehicle, V. When proportioned to the size of the passenger compartment area, P, the shelf 12 may be relatively heavy and/or cumbersome. As such, according to one aspect of the invention, the adjustable shelf system 10 is designed to permit an operator, O (FIGS. 4-7), to leverage the shelf 12 about a pair of roller elements, which are identified at reference numeral 16b, when the shelf 12 is selectively positioned from a first stowed position (FIG. 2) to a second stowed position (FIG. 8), and vice-versa. In describing the operation of the adjustable shelf system 10 according to the embodiment illustrated in FIGS. 3-9, the opposing substantially parallel surfaces 14a, 14b are hereinafter referred to as vehicular quarter panels 14a, 14b.

Referring to FIGS. 2A, 2B, 4A and 4B, the shelf 12 may include one or more passages or openings 22 that a define handle member 24 having an optional lever 26. According to an embodiment of the invention, when the operator, O, grips and applies pressure to the optional levers 26, one or more of the pairs of roller elements 16a-16c and/or pairs of optional locking pins 28a, 28b maybe retracted inboard in the direction of the arrows, R, by way of any desirable coupling device, which is representatively shown at C. As such, in an embodiment if the shelf 12 is a hollow member, the shelf 12 may include internally-located spring members (not shown) to outboard bias the pairs of roller elements 16a-16c and/or pairs of optional locking pins 28a, 28b until the levers 26 are pressed by the operator, O, to retract the one or more pairs of roller elements 16a-16c and/or locking pins 28a, 28b by removing, for example, the outboard bias provided by the spring. Referring to FIGS. 1 and 3, when biased outboard, the pairs of roller elements 16a are received byte pairs of track members 18a-18c, and the pairs of optional locking pins 28a, 28b are received by optional bores 30 formed in the pairs of track members 18a, 18b and/or quarter panels 14a, 14b to positively lock the shelf 12 in place. It will be appreciated that the levers 26, the locking pins 28a, 28b are optional and may be omitted. In addition, the invention can be practiced without retractable pairs of roller elements 16a.

The pairs of track members 18a, 18b are each formed to define a generally C-shaped channel in cross-section. As illustrated, the track members 18a, 18b are located within a generally correspondingly-shaped recess formed in each quarter panel 14a, 14b. However, it will be appreciated that the pairs of track members 18a, 18b may be eliminated, and, if desired, and the pairs of roller elements 16a-16c may directly communicate with the pairs of recesses formed in the quarter panels 14a, 14b. In addition, it will be appreciated that the pairs of track members 18a, 18b are not limited to being generally C-shape in cross-section and that any desirable cross-sectional shape may be utilized, such as T, H, I, or the like. In an alternate embodiment shown in FIGS. 3 and 5-9, each of the quarter panels 14a, 14b may include an arcuate-shaped track member 18d respectively located in a corresponding arcuate-shaped recess in each quarter panel 14a, 14b, rather than the generally linear track member 18c shown in FIG. 1.

Figure 5:
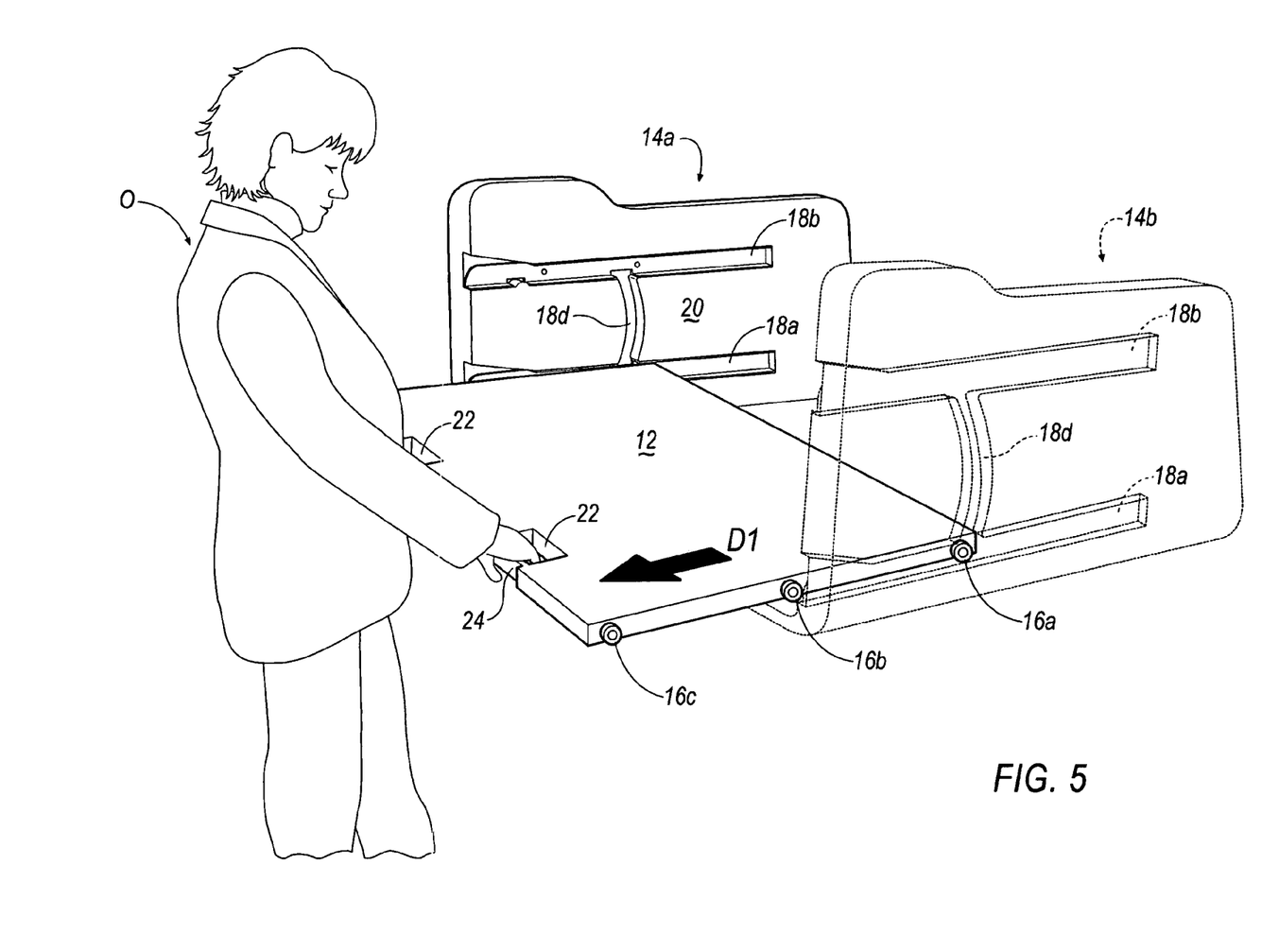
FIG. 5 is a perspective view of the adjustable shelf system according to FIG. 3 being slidably adjusted from the first stowed position according to an embodiment of the invention.
Figure 6:
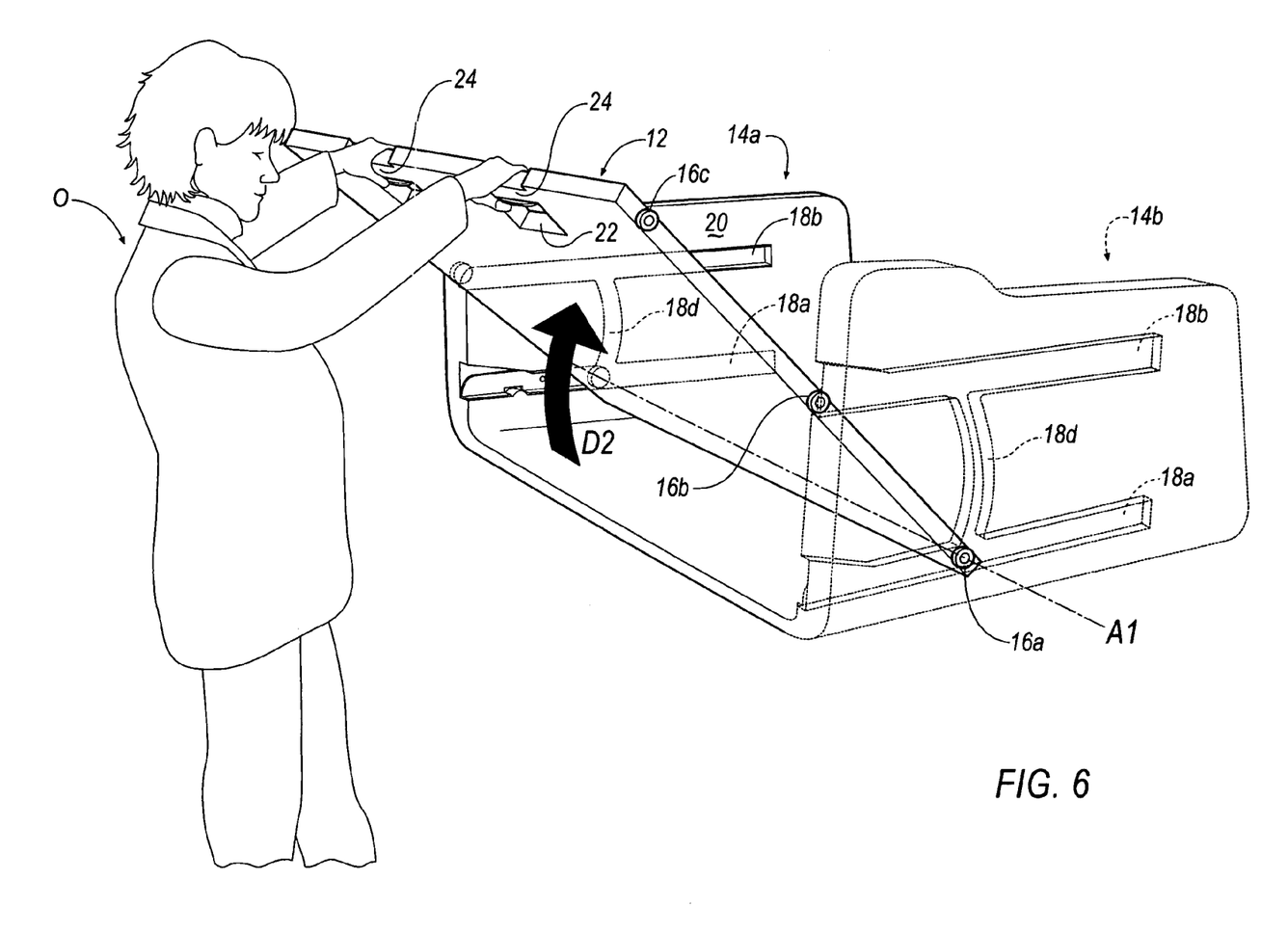
FIG. 6 is a perspective view of the adjustable shelf system according to FIG. 5 being pivotably adjusted about a first axis traversly extending through a front pair of roller elements according to an embodiment of the invention.

In describing the deployment of the shelf 12 shown in FIGS. 5-8, the pairs of roller elements 16a, 16b, 16c are hereinafter referred to as a front pair of roller elements 16a, an intermediate pair of roller elements 16b, and a rear pair of roller elements 16c. Referring to FIG. 5, the operator, O, grips the handle members 24 and slides the shelf 12 in the direction of arrow, D1, such that the shelf 12 partially extends out from the passenger compartment area, P, of the vehicle, V. As illustrated, the shelf 12 is positioned such that the intermediate pair of roller elements 16b are no longer being supported by the first pairs of track member 18a. Then, as shown in FIG. 6, the shelf 12 is pivoted upwardly in the direction of arrow, D2, about a first axis, A1, which passes through the front pair of roller elements 16a located in the first pair of track members 18a, such that the intermediate pair of roller elements 16b may be received in and supported by the second pair of track members 18b. When pivoted about the first axis, A1, the shelf 12 can be easily lifted because the weight of the shelf 12 is leveraged by the front pair of roller elements 16a.

Figure 7:
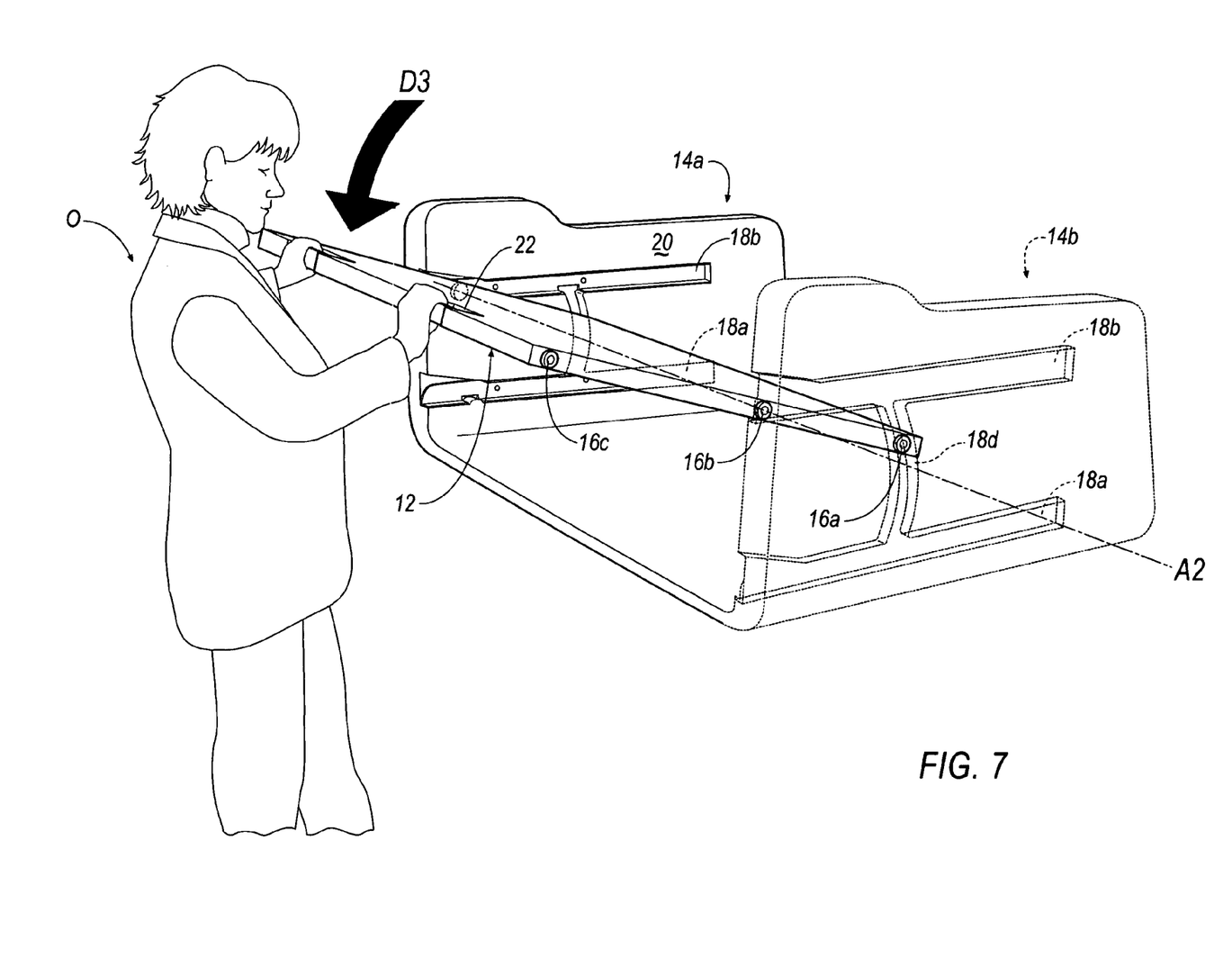
FIG. 7 is a perspective view of the adjustable shelf system according to FIG. 6 being pivotably adjusted about a second axis traversly extending through an intermediate pair of roller elements according to an embodiment of the invention.

Referring to FIG. 7, the shelf 12 is pivoted downwardly in the direction of arrow, D3, about a second axis, A2, which passes through the intermediate pair of roller elements 16b located in the second pair of track members 18b, such that the front pair of roller elements 16a may be guided through the pair of arcuate track member 18d for reception and slidable support by the second pair of track members 18b. When pivoted about the second axis, A2, the weight of the shelf 12 is leveraged by the intermediate pair of roller elements 16b. As such, when raising the shelf 12 from the first pair of track members 18a to the second pair of track members 18b, the intermediate pair of roller elements 16b provide a point of leverage to assist an operator in selectively positioning the shelf. In an alternate embodiment of the invention, each of the quarter panels 14a, 14b may not include the arcuate track members 18d and arcuate recesses; as such, to permit movement of the shelf 12 in the direction of the arrow, D3, the operator, O, may grip and apply pressure to the optional levers 26 to retract the front pair of roller elements 16a in the direction of the arrow, R, as described above.

Figure 8:
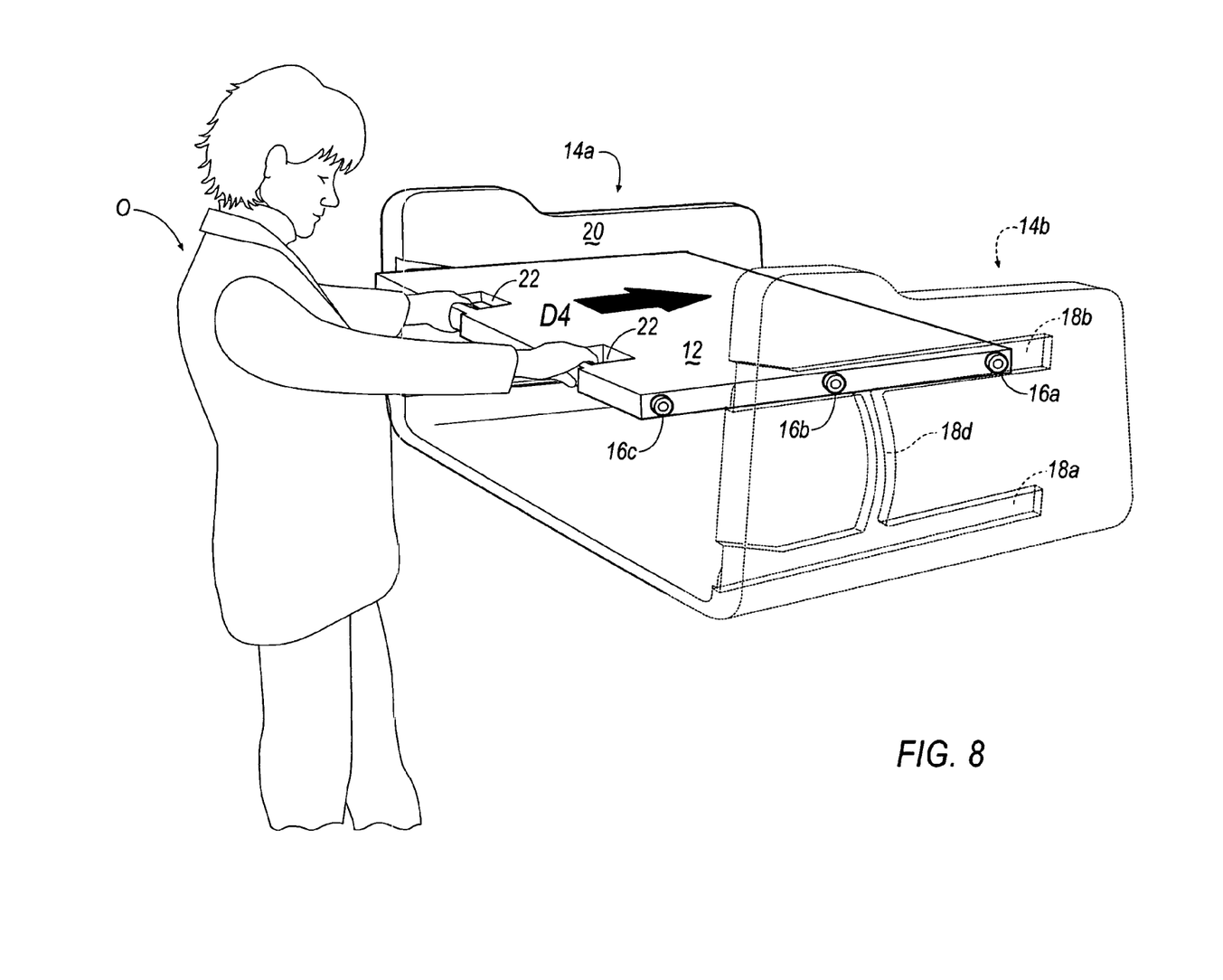
FIG. 8 is a perspective view of the adjustable shelf system according to FIG. 7 being slidably adjusted to a second stowed position according to an embodiment of the invention.

Referring to FIG. 8, upon fully pivoting the shelf 12 in the direction of arrow, D3, such that the shelf 12 lies in the plane of the second pair of track members 18b, the shelf 12 can be slid forward in the direction of arrow, D4, such that the shelf 12 can be fully stowed back into the passenger compartment area, P, of the vehicle, V. When located in the second stowed position as shown in FIG. 9, the shelf 12 is raised above the load floor, which is shown generally at 100, at a height, H. Oppositively, the shelf 12 can be lowered from the second stowed position to the first stowed position by performing the above—described steps in reverse order.

As illustrated in FIG. 3, when the shelf 12 is located in the first stowed position, the shelf 12 is positioned adjacent a generally planar surface defining the load floor 100. However, if desired, the load floor 100 may include a depth (not shown) approximately equal to the thickness, T, of the shelf 12. As such, the shelf 12 may be stowed in the first position within the load floor 100 rather than adjacent a flush surface defining the load floor 100. In yet another alternative embodiment, the load floor 100 may include a depth (not shown) approximately equal a thickness, T*X, such that the depth may accommodate and store any desirable number (X) of shelves 12. However, if multiple shelves 12 are included in the design of the invention, the multiple shelves 12 may be stacked upon each other adjacent the generally planar surface defining the load floor 100.

Although three pairs of roller elements 16a-16c and three pairs of track members 18a, 18b, 18d are shown in the illustrated embodiment in FIGS. 3-9, any desirable number of pairs of roller elements 16a-16c and track members 18a, 18b, 18d may be included in the design of the adjustable shelf system 10. Even further, although the adjustable shelf system 10 is shown to include a single shelf 12 being slidably and pivotably deployed about the track members 18a, 18b, 18d and/or recesses, it will be appreciated that the invention may be practiced with a plurality of shelves 12 that are slidably and pivotably deployed about any desirable number of pairs of track members 18a, 18b, 18d and/or recesses to achieve multi-tiered shelving and/or shelving extending from the rear-most area of the passenger compartment, P, to the forward-most area of the passenger compartment, P, proximate the driver and navigator location when additional seating, such as, for example, second and third row seating, is removed, reconfigured, or stowed to the load floor of the vehicle, V. It will be appreciated that the adjustable shelf system 10 is not limited to a vehicular application as illustrated in FIGS. 3-9, and that the adjustable shelf system 10 may be used in any desirable application, such as, for example, a kitchen cabinet, a refrigerator, an oven, an entertainment center, or the like.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An adjustable shelf system, comprising:
   a first pair of track members;
   a second pair of track members;
   a shelf having a forward end, a rearward end, and a first side and a second side between the forward and rearward ends; and
   a pair of leveraging members extending from said first and second sides and located between said forward and rearward ends, wherein the shelf is operatively connected to said first and second pair of track members, wherein the pair of leveraging members provide selective movement of the shelf between said first and second pair of track members, and further wherein the pair of leveraging members are movable within and selectively contact said first and second pair of track members for moving the shelf about the first and second pair of track members,
   wherein the pair of leveraging members include
      a pair of roller elements to permit said shelf to be movably disposed within said one of the first and second pair of track members when said shelf is operatively connected to said one of the first pair of track members, and
      leveragably disposed and movably disposed within the other of said first and second pair of track members, wherein the shelf includes at least one lever operatively connected to said the pair of roller elements by way of a coupling device for retracting the pair of roller elements that extend from said shelf.

2. The adjustable shelf system according to claim 1, wherein the first and second pair of track members are C-shaped in cross-section.

3. The adjustable shelf system according to claim 1 further comprising
   a third pair of track members that communicatively join said first and second pair of track members; and
   a second pair of roller elements extending from said shelf that are movably-disposable within said first, second, and third pair of track members, wherein, as said first pair roller elements leverage said shelf about the other of said first and second pair of track members, said second pair of roller elements are moved from within said one of said first and second pair of track members to the other of said first and second pair of track members by way of movably-disposing said second pair of roller elements within the third pair of track members.

4. The adjustable shelf system according to claim 1, wherein each of the first and second pair of track members are disposed in recesses formed in opposing substantially parallel surfaces.

5. The adjustable shelf system according to claim 4, wherein the opposing substantially parallel surfaces are quarter panels in a passenger compartment of a vehicle.

6. The adjustable shelf system according to claim 5, wherein the shelf includes at least one pair of retractable locking pins operatively connected to said lever by way of said coupling device, wherein, said retractable locking pins are located about opposing side-walls of the shelf.

7. The adjustable shelf system according to claim 6, wherein the retractable locking pins are adapted to be received by bores formed in the and track members and quarter panels.

8. A method for selectively positioning a shelf in an adjustable shelf system comprising the steps of:
   slidably moving a shelf from a first stowed position within a first pair of track members such that a first pair of roller elements is moved outwardly from and ceases contact with the first pair of track members;
   pivoting the shelf about a first fixed axis passing through a second pair of roller elements located in the first pair of track members;
   positioning the first pair of roller elements in a second pair of track members;
   pivoting the shelf about a second fixed axis passing through the first pair of roller elements positioned in the second pair of track members; and
   slidably moving the shelf to a second stowed position within the second pair of track members, wherein, prior to pivoting the shelf about the second axis step, further comprising the steps of actuating a lever operatively coupled to said second pair of roller elements by way of a coupling device and retracting the second pair of roller elements from the first pair of track members.

9. The method according to claim 8, wherein the pivoting the shelf about a first fixed axis step further comprises bearing the weight of the shelf about the second pair of roller elements.

10. The method according to claim 8, wherein the pivoting the shelf about the second fixed axis step further comprises bearing the weight of the shelf about The first pair of roller elements.

11. The method according to claim 8, wherein the pivoting the shelf about the second axis step further comprises guiding the second pair of roller members through a third pair of track members that communicatively join the first and second pair of track members.

12. The method according to claim 8 further comprising the steps of de-actuating said lever and extending the second pair of roller elements from said retracted position into engagement within the second pair of track members.

13. The method according to claim 8, wherein prior to the first slidably moving step, further comprising the steps of actuating a lever operatively coupled to at least one pair of locking pins by way of a coupling device extending from said shelf and retracting said at least one pair locking pins.

14. A method for selectively positioning a shelf in an adjustable shelf system comprising the steps of:
   slidably moving a shelf from a first stowed position within a first pair of track members such that a first pair of pair elements is moved outwardly from and ceases contact with the first pair of track members;
   pivoting the shelf about a first fixed axis passing through a second pair of roller elements located in the first pair of track members;
   positioning the first pair of roller elements in a second pair of track members;
   pivoting the shelf about a second fixed axis passing through the first pair of roller elements positioned in the second pair of track members; and
   slidably moving the shelf to a second stowed position within the second pair of track members, wherein prior to the first slidably moving step, further comprising the steps of actuating a lever operatively coupled to at least one pair of locking pins by way of a coupling device extending from said shelf and retracting said at least one pair locking pins.

* * * * *

UNITED STATES PATENT AND TRADEMARK OFFICE
CERTIFICATE OF CORRECTION

PATENT NO. : 7,401,716 B2
APPLICATION NO. : 10/896200
DATED : July 22, 2008
INVENTOR(S) : Richard N. Svenson et al.

It is certified that error appears in the above-identified patent and that said Letters Patent is hereby corrected as shown below:

In the Claims:

In Claim 9, Column 6, Line 26, change "The" to -- the --.

In Claim 14, Column 6, at the end of Line 45, change "pair" to -- roller --.

Signed and Sealed this

Fourth Day of November, 2008

JON W. DUDAS
*Director of the United States Patent and Trademark Office*